Patented Feb. 23, 1954

2,670,334

UNITED STATES PATENT OFFICE 2,670,334

ANION-EXCHANGE RESINS FROM AMI-
NATED ARYL ACETYLENE

Gaetano F. D'Alelio, Pittsburgh, Pa., assignor to
Koppers Company, Inc., a corporation of Delaware No Drawing. Application November 6, 1952,
Serial No. 319,171

20 Claims. (Cl. 260—2.1)

This invention relates to new anion-exchange resins. In general it relates to the preparation of ion-exchange resins from aryl acetylene compounds. More particularly it relates to the preparation of anion-exchange resins having quaternary ammonium hydroxide groups. This application is a continuation-in-part of my copending application Serial No. 117,727, now U. S. Patent No. 2,644,801.

Ion-exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Anion-exchange resins used for some of these purposes are disclosed in applicant's U. S. Patent 2,366,008, assigned to the General Electric Company, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehyde resins, and the phenol - formaldehyde - diethylene - triamine and triethylene-tetraamine resins, etc. However, the efficiency of these resins is not sufficiently satisfactory for many anion-exchange purposes.

Divinyl benzene monomer, however, is not commercially available in highly concentrated form since purification methods do not permit concentrations higher than approximately 50 per cent by weight of divinyl benzene. Such divinyl benzene mixtures as are available contain ethyl styrene, diethyl benzene, the various divinyl benzene isomers, etc. in varying proportions. The same condition is also generally true of other divinyl aryl compounds since the commonly used dehydrogenation method of preparing these divinyl aryl compounds from the corresponding dialkyl aryl compounds results in complex mixtures of the divinyl aryl compounds, the starting dialkyl aryl compounds and the intermediate mono-vinyl aryl compounds, as well as isomers and byproducts of the divinyl aryl compound. In any of these complex mixtures, most of the constituents have boiling points which are within a small temperature range, and separation of the monomers by distillation requires careful fractionation. Since the unsaturated compounds, especially the divinyl aryl compounds, have a great tendency to polymerize, the mixtures cannot be subjected to a careful or prolonged distillation without considerable loss of monomer through polymerization. Therefore, the use of these divinyl aryl compounds is generally limited to mixtures having concentrations of no more than about 50 per cent divinyl aryl compound.

The fact that these divinyl aryl compounds are commercially available only in such complex mixtures in which the proportions of the various components are unpredictable and difficult to control makes it difficult to control exactly the nature of the copolymers resulting from polymerization with styrene, etc. Moreover, the presence of compounds such as diethyl benzene in the polymerization mixture retards the formation of high molecular weight polymers, and variations in the available amount of divinyl aryl compounds in these mixtures cause variations in the amount of cross-linking accomplished in the resulting copolymers.

Ion-exchange resins of great utility have now been found which comprise the water-insoluble polymers of aryl acetylenes containing amino or quaternary ammonium hydroxide groups. These ion-exchange resins can be prepared by the nitration of cross-linked aryl acetylene polymers followed by reduction and alkylation or quaternization. These resins are especially efficient in the adsorption of anions from liquid media.

Any polymerizable aryl acetylene, which advantageously has at least one nuclear position available for substitution by a nitro group, can be used for preparing the ion-exchange resins disclosed herein, for example, phenyl acetylene, tolyl acetylene, xylyl acetylene, naphthyl acetylene, para-phenyl-phenyl acetylene, etc., and various derivatives thereof, such as the chloro, alkyl, alkenyl, etc. The resin products comprise homopolymers of aryl acetylenes, copolymers of any number of aryl acetylenes or copolymers of one or more aryl acetylenes with any number of other copolymerizable ethylenic monomers.

The aryl acetylene polymers suitable for the practice of this invention are cross-linked polymers, an aryl acetylene itself acting as cross-linking agent either in a homopolymer or in a copolymer with other aryl acetylenes or in a copolymer with other copolymerizable monomers. When the copolymerizable monomers contain aromatic nuclei having positions available for substitution, the attachment of amino or quaternary ammonium groups may be made on the aromatic nuclei of both the aryl acetylene and the copolymerizing monomer. Copolymerizable monomers which have aromatic nuclei available for substitution include vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrenes, e. g., o, m and p-methyl-styrenes, dimethyl-styrenes, o, m and p-ethyl-styrenes, isopropyl-styrenes, tolyl-styrenes, benzyl-styrenes, cyclohexyl-styrenes, methoxy-styrenes, phenoxy-styrenes, o, m, and p-chlorostyrenes, o, m, and p-fluoro-styrenes, chloromethyl - styrenes, fluoromethyl - styrenes, trifluoro-methyl - styrenes, vinyl-methyl-naphthalenes, vinyl-ethyl-naphthalenes, vinyl-chloro-naphthalenes, vinyl-methyl-chloro-naphthalenes, etc. Other aromatic monomers which can also be used include aromatic compounds having a vinyl group containing an alkyl group in its alpha position, e. g., isopropenyl or alpha-methyl-vinyl, alpha-ethyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds For ease of polymerization, the alpha-alkyl group is advantageously methyl or ethyl. When the alpha-alkyl-vinyl type of aromatic monomer is used as a copolymerizing monomer, ionic-type polymerization catalysts may be used advantageously.

An especially advantageous mixture to use in the practice of this invention is a mixture of styrene and phenyl acetylene which is recovered in the purification of styrene obtained by the pyrolytic dehydrogenation of ethyl benzene or from light oils obtained from byproduct coal tar and from coal gas production. For most purposes the presence of phenyl acetylene in styrene is undesirable since subsequent polymerization produces a cross-linked styrene polymer or other types of polymers having properties generally undesirable for molding purposes. However, the cross-linked polymer product of such a mixture is suitable for nitration, etc., to produce ion-exchange resins in accordance with the practice of this invention.

Certain other monomers, such as isobutylene, isoamylene, etc. may be used in place of or in addition to the above-mentioned aromatic compounds. However, these other monomers should not have functional groups which will interfere with the subsequent treatment or ion-exchange activities of the products, or which may be ruptured to give substantial decrease in length of polymer chains or in cross-linking. Some copolymers prepared by the copolymerization of phenyl acetylene with copolymerizable compounds, such as styrene and isobutylene, are not new and have been disclosed previously. However, the insoluble, infusible copolymers of these monomers are new as are their amino and quaternary ammonium derivatives claimed herein which are suitable as ion-exchange resins. It is also possible to make these resins from polymerizable monomers which have nitro or amino groups attached to aromatic nuclei.

The invention may be best described by the following examples. These examples serve to illustrate various methods of practicing the invention and are not intended as limitations to the scope of the invention. In these examples and throughout the specification "parts" and "per cent" are given in parts and per cent by weight.

Example I

Cross-linked copolymers in bead form are made by suspension polymerization in a pressure-tight autoclave by the following procedure. To the autoclave are added:

0.18 part benzoyl peroxide—dissolved in the styrene
0.05 part t-butyl perbenzoate—dissolved in the styrene
95 parts styrene
5 parts phenyl acetylene
200 parts distilled water
3 parts hydroxy apatite (submicronic particle size)
0.03 parts sodium oleate The autoclave is then closed and agitated by a rocking mechanism while the autoclave is immersed in a controlled-temperature bath at 90° C. for 10 hours and then at 113–115° C. for 5 hours. In each case, the resultant copolymer beads are washed with dilute HCl, then with water, and subsequently dried at 70° C. for about two hours.

Fifty parts of these copolymer beads are refluxed for two hours with 200 parts of a mixture of one part nitric acid and one and one-half parts concentrated sulfuric acid. The product is washed with distilled water and the nitration procedure is repeated. The nitrated copolymer is reduced by refluxing for approximately three hours with approximately 100 parts stannous chloride and 400 parts hydrochloric acid. The aminated polymerizate is washed with water, dilute sodium hydroxide solution and finally with distilled water.

In the preceding example the phenyl acetylene may be replaced by tolyl acetylene, xylyl acetylene, naphthyl acetylene, etc., and the styrene may be replaced by one or more of the vinyl aryl compounds previously mentioned. The following examples illustrate how the aminated copolymers of this invention can be used for adsorbing anions from liquid medium.

Example II

One hundred parts by weight of the resin of Example I is wet with 50 parts by weight of distilled water, and then 100 parts by weight of a standardized hydrochloric acid solution is added with shaking. After the resin and the solution have been in contact for about 15 minutes, the solution is separated from the resin by filtration. The filtrate solution is then titrated with sodium hydroxide to determine the amount of hydrochloric acid still in solution. If the filtrate solution has been completely neutralized by the resin, the procedure is repeated using a larger amount of the hydrochloric acid solution with a fresh sample of the resin. The efficiency of the resin is determined by calculating the ratio of chloride ions actually removed from the solution to the chloride ions theoretically removable. A good efficiency is indicated by these calculations.

Example III

The exhausted resin of Example II is regenerated by treatment with about ⅓ normal sodium hydroxide solution. After the solution is removed by filtration the resin is washed well with distilled water and retested for its anion-adsorption capacity according to the above-mentioned procedure. The efficiency after regeneration approximates the original capacity of the resin.

Example IV

One hundred parts of the resin of Example I is admixed with excess ethyl bromide and maintained at reflux temperature for approximately one day to effect exhaustive alkylation. There is obtained the quaternary ammonium bromide form of the resin. The resin containing quaternary ammonium bromide groups is separated from the ethyl bromide by filtration and washed with a small volume of a volatile organic solvent such as diethyl ether. Upon treatment of this resin wth approximately ⅓ normal sodium hydroxide solution there is obtained the quaternary ammonium hydroxide form of the resin.

Example V

The quaternary ammonium hydroxide resin of Example IV is tested for ion-exchange efficiency by the procedure of Example II. An excellent efficiency is indicated.

Example VI

The exhausted resin of Example V is regenerated by treatment with about ⅓ normal sodium hydroxide solution. After the solution is removed by filtration the resin is washed well with distilled water and retested for its anion-adsorption capacity according to the above-mentioned procedure. The efficiency after regeneration approximates the original capacity of the resin.

The quaternary ammonium hydroxide resins of this invention are very efficient anion-adsorption agents due very likely to the highly basic character of the quaternary ammonium hydroxide groups. Other anions which may be removed from solution by the water-insoluble polymers of this invention, in addition to the chloride anions previously mentioned, include nitrate ions, sulfate ions, acetate ions, oxalate ions, tartrate ions, or any other anions which will react with the basic quaternary ammonium hydroxide groups in the resin to form insoluble salts. Apparently because of the highly basic character of the quaternary ammonium hydroxide groups, these resins are more efficient than the previously used amine-type anion-exchange resins. These anion-exchange resins can be readily regenerated by washing with a dilute alakli solution, preferably of an alkali-metal hydroxide which forms soluble salts with the adsorbed anions.

Although the above examples show the use of phenyl acetylene with styrene and isobutylene, it will be understood that other aryl acetylenes, as mentioned above, and other copolymerizable ethylenic compounds as previously mentioned may be used in various proportions for preparing the insoluble, infusible polymers. Since the amino or quaternary ammonium groups are the active ion-removing groups in these products and since these groups are introduced most easily into an aryl nucleus, it is advantageous that the major portion of the polymerization mixture be of polymerizable monomers containing an aryl nucleus, and it is necessary that there are positions available on the aryl nucleus of attaching these groups. For this latter reason it is advantageous that the aryl nucleus has few, if any, constituents thereon.

The cross-linked copolymers suitable for the practice of this invention can be prepared by any method which will give infusible, insoluble resins, for example, by mass, solution, emulsion or suspension polymerization. The polymerizations may be advantageously catalyzed by various types of catalysts, such as peroxides, e. g., benzoyl, hydrogen, acetyl, acetyl-benzoyl, phthalyl, lauroyl peroxides, tert-butylhydroperoxide, etc.; other per-compounds, e. g., ammonium persulfate, sodium persulfate, sodium perchlorate, etc.; and in some cases the Friedel-Crafts type catalysts, such as aluminum chloride, advantageously at low temperatures.

Inert material, such as diatomaceous earth, alundum, coke, silica, cinders, porous glass, etc., may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

It will be realized that the anion-exchange resins of this invention can be prepared from aryl acetylenes containing amino or quaternary ammonium hydroxide groups in the aryl nucleus. Similarly, vinyl aromatic compounds containing amino or quaternary ammonium hydroxide groups can be copolymerized with phenyl acetylenes to produce the insoluble, infusible anion-exchange resins of this invention.

It will be realized that in preparing the quaternary ammonium forms of the resins of this invention that any alkyl or aralkyl halides normally used for quaternization can be utilized in place of the ethyl bromide utilized in Example IV.

The invention as hereinbefore set forth is embodied in particular form and manner but may be variously embodied within the scope of the claims hereinafter made.

I claim:

1. A water-insoluble resin containing a plurality of quaternary ammonium hydroxy groups, said groups being attached to an insoluble, infusible resin prepared by the polymerization of a polymerizable mass comprising a polymerizable aryl acetylene hydrocarbon compound, said groups being represented by the formula

—NR₃OH in which R is a member of the class consisting of alkyl and aralkyl groups.

2. A water-insoluble resin of claim 1, in which the polymerizable aryl acetylene compound is phenyl acetylene.

3. A water-insoluble resin of claim 1, in which the polymerizable aryl acetylene compound is naphthyl acetylene.

4. A water-insoluble resin of claim 1, in which the polymerizable mass contains a copolymerizable aromatic compound selected from the class consisting of copolymerizable mono-vinyl-aromatic and mono-(alpha-alkyl-vinyl)-aromatic hydrocarbon compounds, said alpha-alkyl groups having less than 3 carbon atoms.

5. A water-insoluble resin of claim 4 in which the polymerizable aryl acetylene hydrocarbon compound is phenyl acetylene and the copolymerizable aromatic compound is styrene.

6. A water-insoluble resin of claim 4 in which the polymerizable aryl acetylene hydrocarbon compound is naphthyl acetylene and the copolymerizable aromatic compound is vinyl naphthalene.

7. An inert carrier coated with an insoluble, infusible resin of claim 1.

8. An insoluble, infusible polymeric aryl acetylene hydrocarbon compound containing a plurality of quaternary ammonium hydroxy groups of the formula —NR$_3$OH in which R is a member of the class consisting of alkyl and aralkyl.

9. An insoluble, infusible polymeric phenyl acetylene containing a plurality of quaternary ammonium hydroxy groups of the formula

—NR$_3$OH in which R is a member of the class consisting of alkyl and aralkyl.

10. An insoluble, infusible polymeric phenyl acetylene containing in the polymer molecule at least one copolymerizable aromatic compound of the class consisting of mono-vinyl-aromatic and mono-(alpha-alkyl-vinyl)-aromatic compounds, said alpha-alkyl groups having less than 3 carbon atoms, said polymer molecule containing a plurality of quaternary ammonium hydroxy groups of the formula —NR$_3$OH in which R is a member of the class consisting of alkyl and aralkyl.

11. An insoluble, infusible polymeric phenyl acetylene of claim 10 in which the copolymerizable aromatic compound is styrene.

12. In a process for the preparation of a water-insoluble ion-exchange resin the steps of nitrating an insoluble polymeric aryl acetylene hydrocarbon compound, reducing the nitro groups to amino groups, exhaustively alkylating said amino groups with an alkylating agent chosen from the group consisting of alkyl and aralkyl halides, and treating said resin with sodium hydroxide to produce the quaternary ammonium hydroxy form of the resin.

13. The process steps of claim 12 in which the polymeric aryl acetylene hydrocarbon compound contains in the polymer molecules a copolymerizable aromatic compound of the class consisting of copolymerizable mono-vinyl-aromatic and mono-(alpha-alkyl-vinyl)-aromatic hydrocarbon compound, said alpha-alkyl groups having less than 3 carbon atoms.

14. The process steps of claim 12 in which the polymerizable aryl acetylene compound is phenyl acetylene.

15. The process steps of claim 12 in which the polymerizable mass also contains styrene.

16. The method of treating liquid media to remove anions therefrom which comprises contacting said media with an insoluble, infusible resin containing quaternary ammonium hydroxy groups and separating said resin from the liquid media, said resin comprising the polymerization product of a polymerizable mass comprising a polymerizable aryl acetylene hydrocarbon compound, said resin containing a plurality of quaternary ammonium hydroxide groups of the formula —NR$_3$OH in which R is a member of the class consisting of alkyl and aralkyl.

17. The method of claim 16 in which the polymerizable aryl acetylene compound is phenyl acetylene.

18. The method of claim 16 in which the polymerizable aryl acetylene compound is naphthyl acetylene.

19. The method of claim 16 in which the polymerizable aryl acetylene compound is phenyl acetylene and the polymerizable mass also contains styrene.

20. The method of claim 16 in which the polymerizable aryl acetylene compound is naphthyl acetylene and the polymerizable mass also contains vinyl naphthalene.

GAETANO F. D'ALELIO.

No references cited.